(12) United States Patent
Chuang

(10) Patent No.: US 9,302,620 B2
(45) Date of Patent: Apr. 5, 2016

(54) MONITORING DEVICE OF POWER LINE AND CAMERA

(71) Applicant: Chih-Yung Chuang, Taoyuan County (TW)

(72) Inventor: Chih-Yung Chuang, Taoyuan County (TW)

(*) Notice: Subject to any disclaimer, the term of this patent is extended or adjusted under 35 U.S.C. 154(b) by 292 days.

(21) Appl. No.: 14/165,809

(22) Filed: Jan. 28, 2014

(65) Prior Publication Data

US 2015/0210215 A1 Jul. 30, 2015

(51) Int. Cl.
*H04N 7/18* (2006.01)
*B60R 1/00* (2006.01)

(52) U.S. Cl.
CPC *B60R 1/00* (2013.01); *H04N 7/183* (2013.01); *B60R 2300/406* (2013.01); *H04N 7/181* (2013.01)

(58) Field of Classification Search
CPC .... B60R 1/00; B60R 2300/406; H04N 7/183; H04N 7/181
See application file for complete search history.

(56) References Cited

U.S. PATENT DOCUMENTS 5,680,123 A * 10/1997 Lee .......................... B60Q 1/52
340/435
6,995,687 B2 * 2/2006 Lang ......................... B60R 1/00
340/431

* cited by examiner

*Primary Examiner* — Andy Rao
*Assistant Examiner* — Tyler Edwards
(74) *Attorney, Agent, or Firm* — Rosenberg, Klein & Lee

(57) ABSTRACT

A monitoring device of power line and camera mounted on a vehicle comprises single power line integrated power supply and signal that simplify the complexity of wiring for easy installation and maintenance, reducing costs. When a camera captures an image signal, the power line generates carrier wave for the image signal as a radio frequency signal being transmitted to a wired cable line and then to the screen host.

9 Claims, 7 Drawing Sheets

MONITORING DEVICE OF POWER LINE AND CAMERA

BACKGROUND OF THE INVENTION

1. Field of the Invention

The invention relates to a monitoring device of power line and camera, which ingrates single power line, signals, and power supply.

2. Description of the Related Art

When reversing a vehicle 80 as shown in FIG. 1, the driver must rely on the rearview mirror to detect objects in the rear of the vehicle 80; however, right behind the vehicle 80 is a dead space for detection.

The vehicle 80 such as the trailers, trucks has a tractor 801 to lead the container 802 so that it is not easy for drivers to detect objects surrounding the vehicle 80. Moreover, the tractor 801 and container 802 are separated because of transportation considerations, resulting difficult wiring of transmission lines of power or signal for a monitoring device.

With the referenced to FIG. 2, the U.S. Pat. No. 5,680,123 disclosed three video cameras 82 to detect objects in the regions A, B, and C, and a display apparatus (not shown) installed in the tractor 801 to show the objects from regions A, B, and C by signal control switch (not shown). However, it is hard to install signal transmission lines and power transmission lines of the monitoring device on the vehicle 80.

With the referenced to FIG. 3, the U.S. Pat. No. 6,995,687 disclosed a radio frequency transmission without wiring having an information provider 83 installed at the tractor 801, and a detector installed at the container 802 to transmit non-wired image signals S80, S83, S84. However, interference problem of wireless transmission easily occurs in the car.

SUMMARY OF THE INVENTION

It is the main object of the present invention to provide a monitoring device of power line and camera to combine signal power line with signals and power for simplified wiring, easy installation and dismantling, being modular without affecting separation of tractor and container; such that the present invention ingrates single power line, signals and power supply.

In order to achieve the above object, the monitoring device of power line and camera mounted on a vehicle, comprises a cable line installed within the vehicle, and electrically connected to a power system of the vehicle to form a first power line; a first camera located at a periphery of the vehicle to capture a first image signal; a radio frequency transmitter having an input end electrically connected to the first camera and an output end electrically connected to the first power line, and the first image signal transmitted to the first power line by the radio frequency transmitter; a screen host located in the vehicle to display the first image signal; and a radio frequency receiver having an input end electrically connected to the first power line and an output end electrically connected to the screen host, and the first power line as a medium receiving the first image signal from the radio frequency transmitter and transmitting the signal to the screen host; whereby the first power line generates carrier wave for the first image signal as a radio frequency signal being transmitted to the wired cable line and then to the screen host.

Based on the features disclosed, the radio frequency transmitter is electrically connected to a second camera to capture a second image signal, and the second camera is embedded in a rearview mirror of the vehicle. The power line is electrically connected to a second power line, and the second power line is electrically connected to a driving video recorder. The driving video recorder is electrically connected to a third camera which captures a third image signal, and the third camera is arranged in a front end of the vehicle.

Further, the radio frequency transmitter has a first circuit module, and the first circuit module has a modulator, a first oscillator, a first operational amplifier, and a first capacitor; the first image signal or second image signal is modulated into high frequency signal by the modulator, transmitted to the first oscillator to produce periodic sinusoidal wave signal, and then amplified by the first operational amplifier to be transmitted to the first capacitor for signal coupling, and finally the signal is transmitted to the first power line. The first power line in parallel is electrically connected to a first pulse-width modulation and second pulse-width modulation to control voltage and supply power for the first camera or second camera, and the first circuit module.

Further, the radio frequency receiver has a second circuit module, and the second circuit module has a demodulator, a frequency mixer, a second oscillator, a surface filter, a second operational amplifier, a third operational amplifier, a forth operational amplifier, and a second capacitor; the high frequency signal is transmitted to the first power line and the second capacitor for signal coupling, amplified by the second operational amplifier, and then transmitted to the second oscillator to produce periodic sinusoidal wave signal; at the same time, the amplified signal and sinusoidal wave signal are mixed by the frequency mixer to form intermediate frequency signal; the signal is amplified by the third operational amplifier, transmitted to the surface filter for noise filtering, and then amplified by the forth operational amplifier to be transmitted to the demodulator for the intermediate frequency signal being demodulated into the first image signal or second image signal, and finally the signal is transmitted to the screen host.

Furthermore, the first power line in parallel is electrically connected to a third pulse-width modulation and forth pulse-width modulation to control voltage and supply power for the screen host, and the second circuit module.

The first power line further has a first cable connector and second cable connector.

Based on the features disclosed, the present invention combines the radio frequency transmitter and radio frequency receiver by the first power line to avoid noise interference and strengthen the stability of the device. Also, the combination of single power line, signals and power supply simplify wiring, and have easy installation and dismantling modular for integrating the power lines, power supply, and signals without affecting the separation of tractor and container.

DETAILED DESCRIPTION OF THE PREFERRED EMBODIMENT

Figure 1:
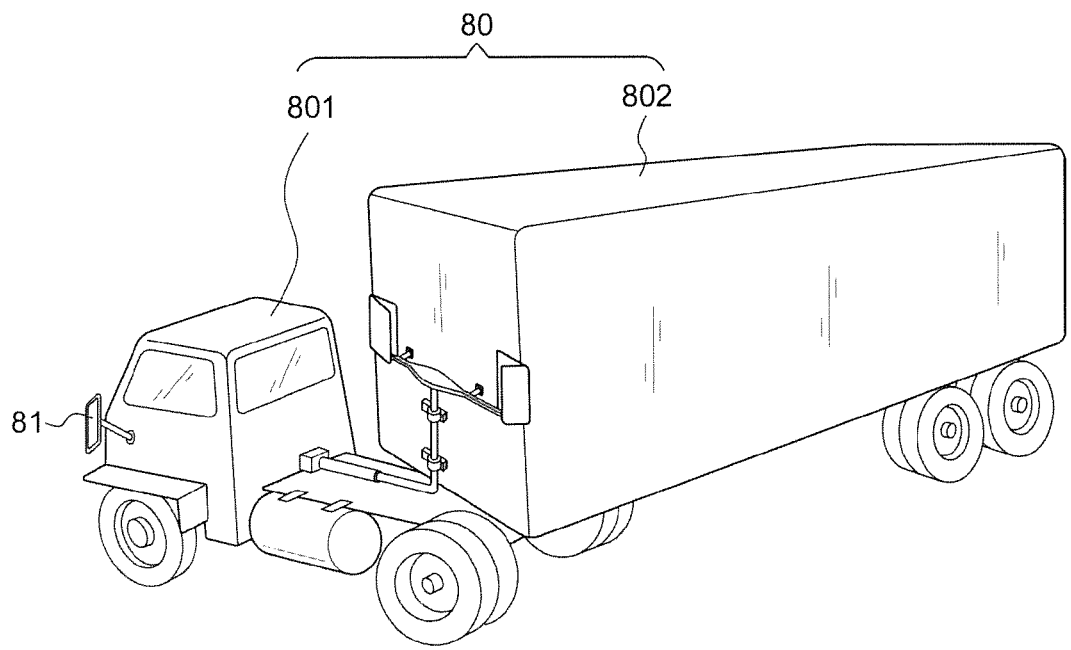
FIG. 1 is a schematic view of a conventional monitoring device of rearview mirror for vehicles.
Figure 2:
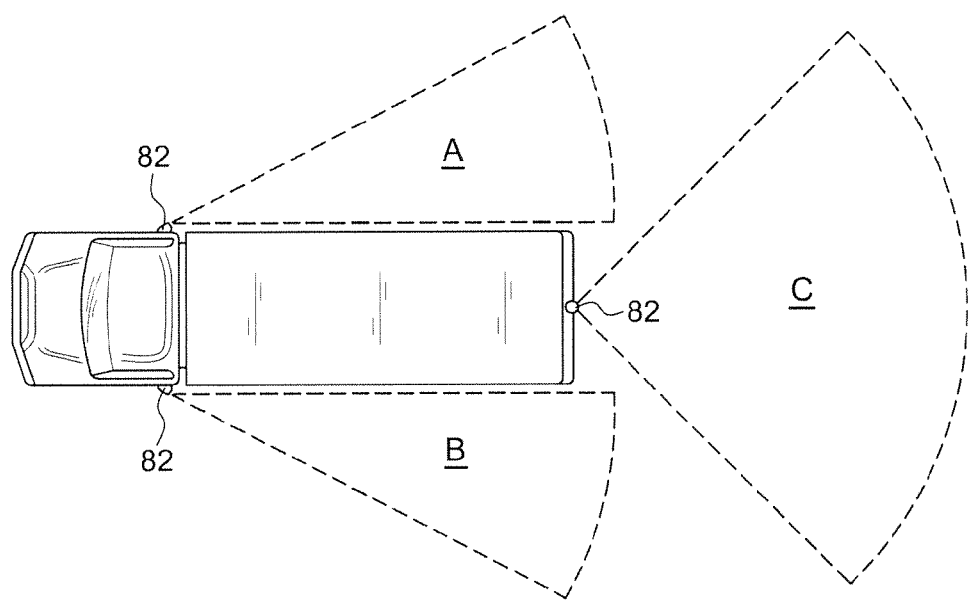
FIG. 2 is a schematic view of a conventional camera monitoring device with cable transmission for vehicles.
Figure 3:
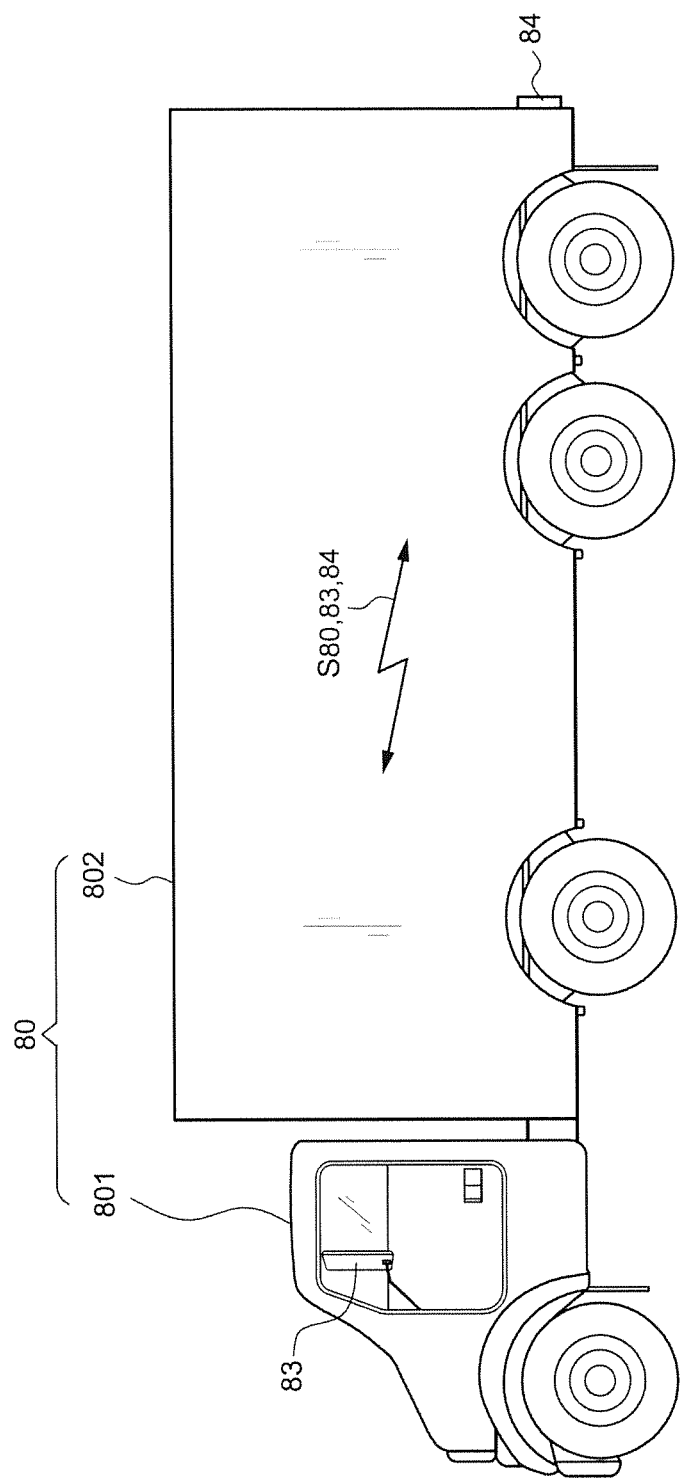
FIG. 3 is a schematic view of a conventional camera monitoring device with wireless transmission for vehicles.
Figure 4:
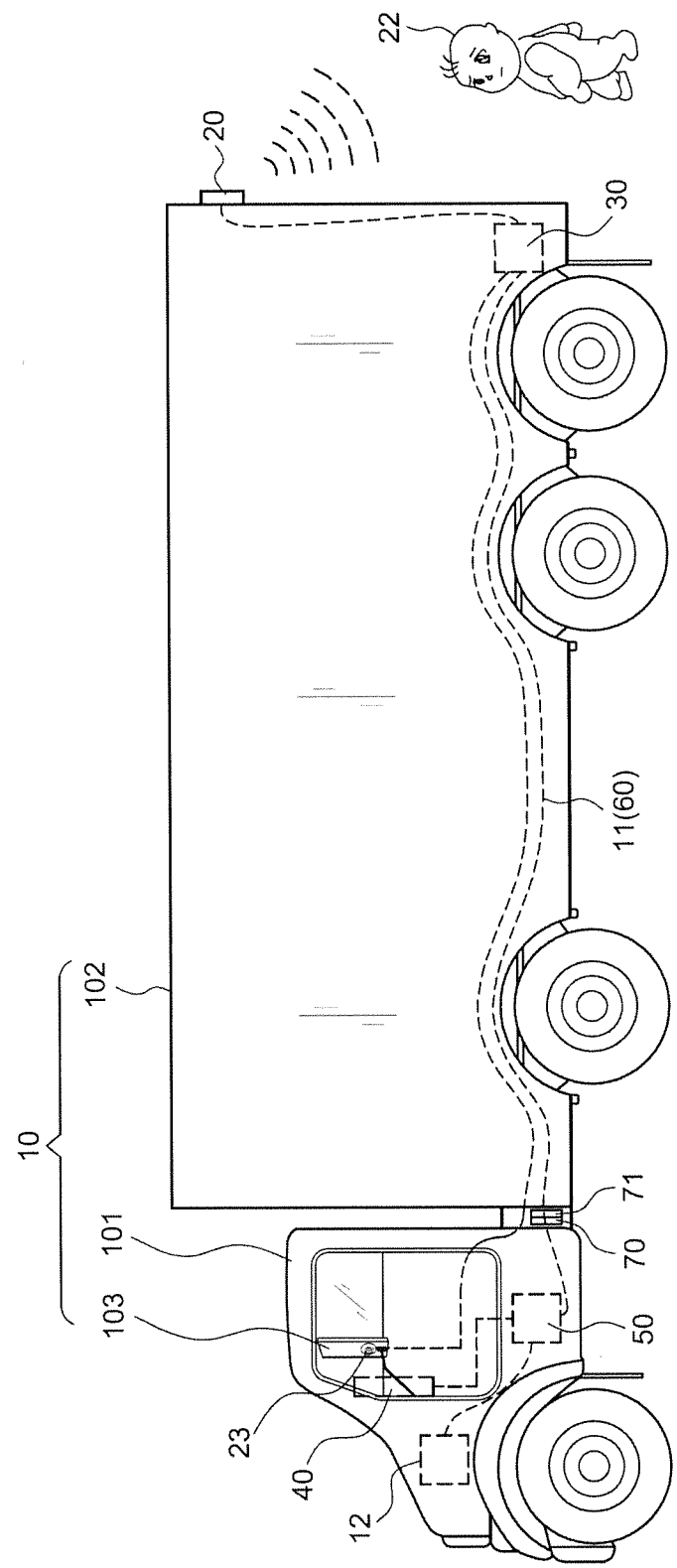
FIG. 4 is a schematic view of monitoring device of power line and camera in accordance with the present invention.
Figure 5:
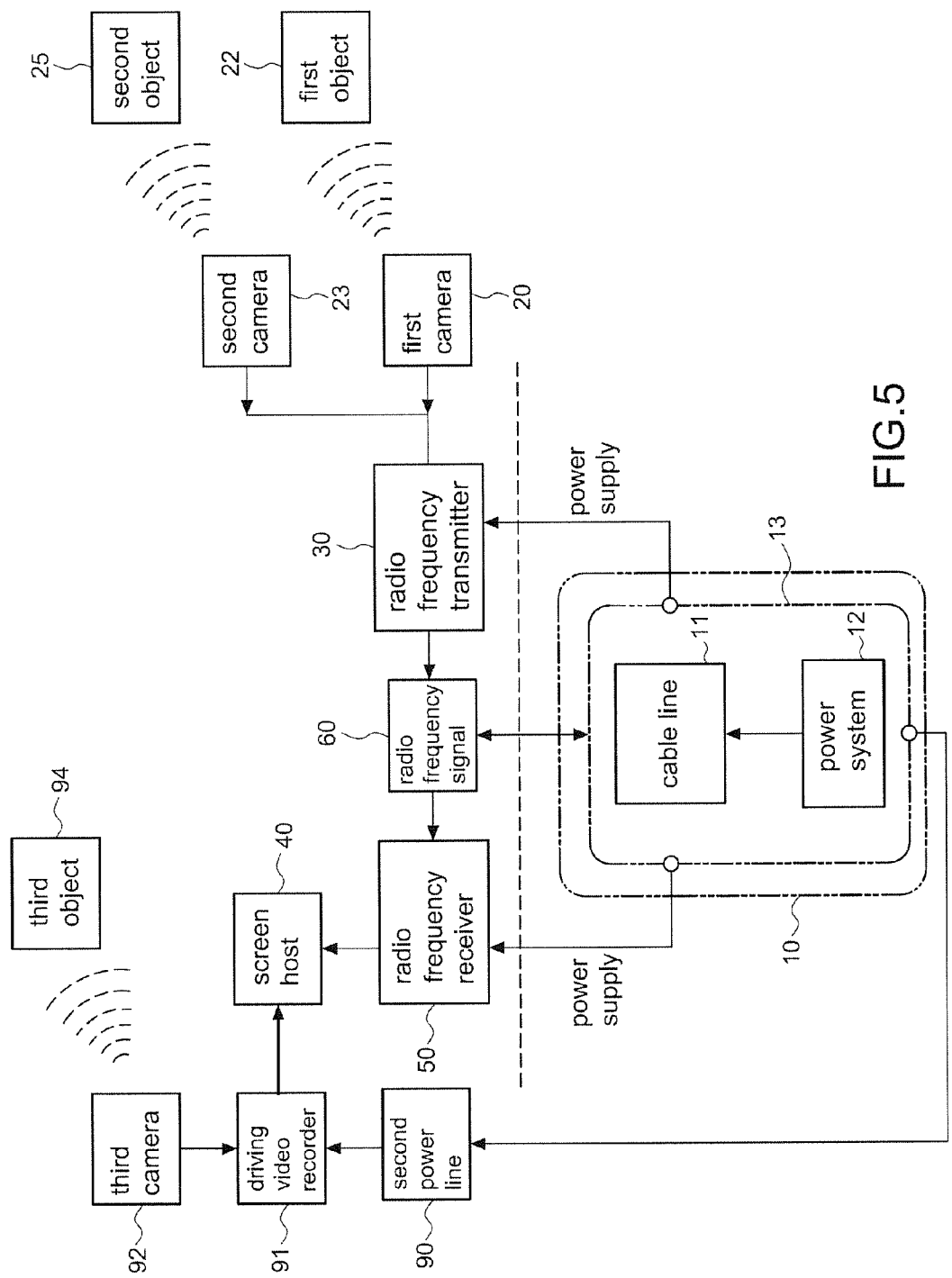
FIG. 5 is a circuit block view of monitoring device of power line and camera in accordance with the present invention.

Referring to FIGS. 4 and 5, the preferred embodiment of a monitoring device of power line and camera mounted on a vehicle 10, comprises a cable line 11 installed within the vehicle 10, and electrically connected to a power system 12 of the vehicle 10 to form a first power line 13. The first power line 13 has both ends respectively and electrically connected to a radio frequency transmitter 30 and a radio frequency receiver 50. The first cable connector 70 and second cable connector 71 are arranged at a junction of the first power line 13 to separate a tractor 101 and container 102 of the vehicle 10 for reducing the correlation between the location of the radio frequency transmitter and radio frequency receiver 30, 50, and enhancing independence.

The vehicle 10 has a screen host 40 and a first camera 20 respectively arranged at a front end and rear end thereof. The radio frequency transmitter 30 has an input end electrically connected to the first camera 20 and an output end electrically connected to the first power line 13, and the radio frequency receiver 50 has an input end electrically connected to the first power line 13 and an output end electrically connected to the screen host 40 so that the first power line 13 supplies power for the radio frequency transmitter and radio frequency receiver 30, 50 for transmitting radio frequency signal 60, and the first power line 13 also supplies power for the first camera and screen host 20, 40.

In the embodiment, the first camera 20 takes a first object 22 to capture a first image signal 21; the radio frequency transmitter 30 is electrically connected to a second camera 23 to take a second object 25 and capture a second image signal 24, and the second camera 23 is embedded in a rearview mirror 103 of the vehicle 10. As a result, the radio frequency transmitter 30 transmits the first image signal or second image signal 21, 24 to the first power line 13, and the first power line 13 as a medium receiving the first image signal 21 from the radio frequency transmitter 30 and transmitting the signal to the screen host 40.

Corresponding to the above features, the power line 13 is electrically connected to a second power line 90, and the second power line 90 is electrically connected to a driving video recorder 91. The driving video recorder 91 is electrically connected to a third camera 92 which takes a third object 94 to capture a third image signal 93 for being transmitted to the screen host 40 and being recorded un the driving video recorder 91. Further, the power line 13 is electrically connected to the second power line 90 for the first image signal or second image signal 21, 24 to be transmitted to the second power line 90, and recorded to the driving video recorder 91.

Figure 6:
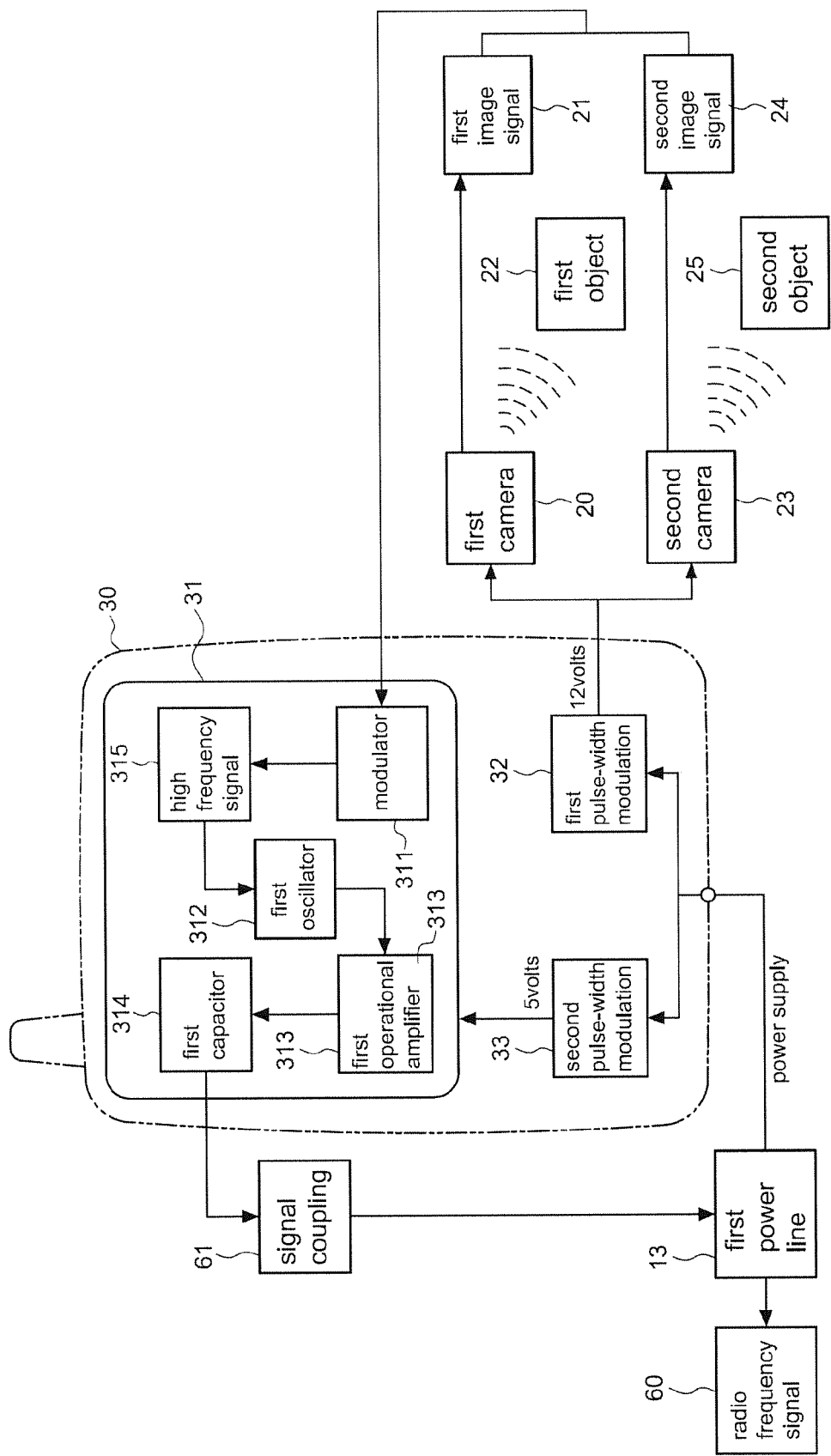
FIG. 6 is a circuit block view of a radio frequency transmitter of the present invention.

With the reference FIG. 6, the radio frequency transmitter 30 has a first circuit module 31, and the first circuit module 31 has a modulator 311, a first oscillator 312, a first operational amplifier 313, and a first capacitor 314; the first image signal or second image signal 21, 24 is modulated into high frequency signal 315 by the modulator 311, transmitted to the first oscillator 312 to produce periodic sinusoidal wave signal, and then amplified by the first operational amplifier 313 to be transmitted to the first capacitor 314 for signal coupling 61, and finally the signal is transmitted to the first power line 13.

Further, the first power line 13 in parallel is electrically connected to a first pulse-width modulation 32 and second pulse-width modulation 33 to respectively send voltage of 5 volts (V) to the first circuit module 31, and voltage of 12 volts (V) to the first camera 20 for controlling voltage and supplying power for the first camera 20 or the second camera 23, and the first circuit module 31.

Figure 7:
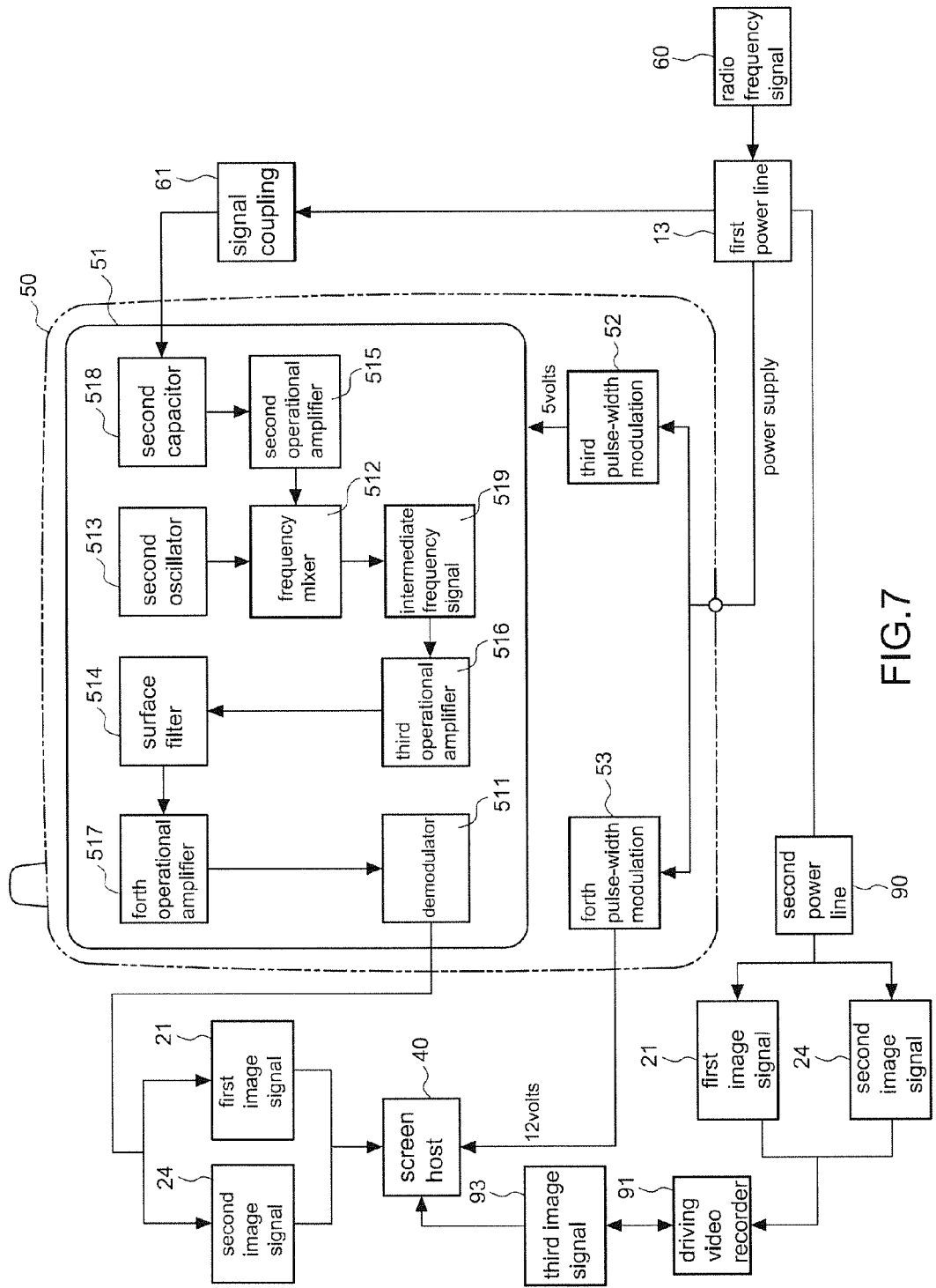
FIG. 7 is a circuit block view of a radio frequency receiver of the present invention.

With the reference FIG. 7, the radio frequency receiver 50 has a second circuit module 51, and the second circuit module 51 has a demodulator 511, a frequency mixer 512, a second oscillator 513, a surface filter 514, a second operational amplifier 515, a third operational amplifier 516, a forth operational amplifier 517, and a second capacitor 518; the high frequency signal 315 is transmitted to the first power line 13 and the second capacitor 518 for signal coupling, amplified by the second operational amplifier 515, and then transmitted to the second oscillator 513 to produce periodic sinusoidal wave signal; at the same time, the amplified signal and sinusoidal wave signal are mixed by the frequency mixer 512 to form intermediate frequency signal 519; the signal is amplified by the third operational amplifier 516, transmitted to the surface filter 514 for noise filtering, and then amplified by the forth operational amplifier 517 to be transmitted to the demodulator 511 for the intermediate frequency signal 519 being demodulated into the first image signal or second image signal 21, 24, and finally the signal is transmitted to the screen host 40.

Further, the first power line 13 in parallel is electrically connected to a third pulse-width modulation 52 and forth pulse-width modulation 53 to respectively send voltage of 5 volts (V) to the second circuit module 51, and voltage of 12 volts (V) to the screen host 40 for controlling voltage and supplying power for the screen host 40 and the second circuit module 51.

Figure 8:
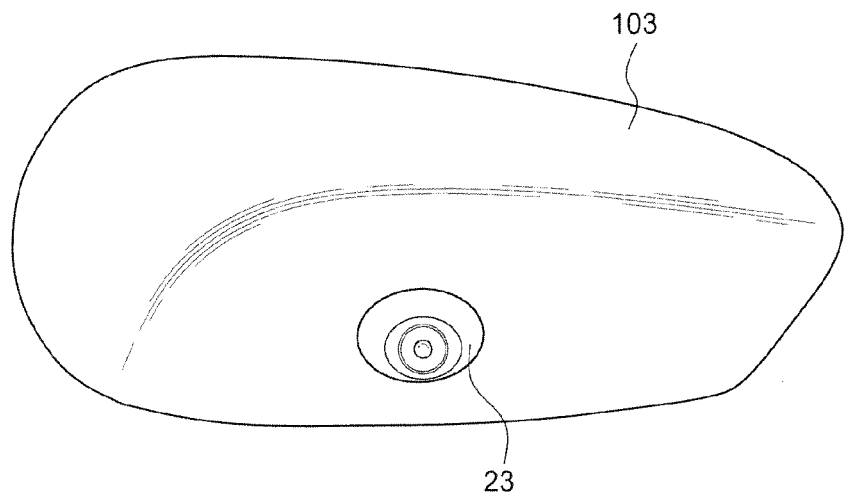
FIG. 8 is a schematic view of the present invention, showing a camera embedded in a rearview mirror.
Figure 9:
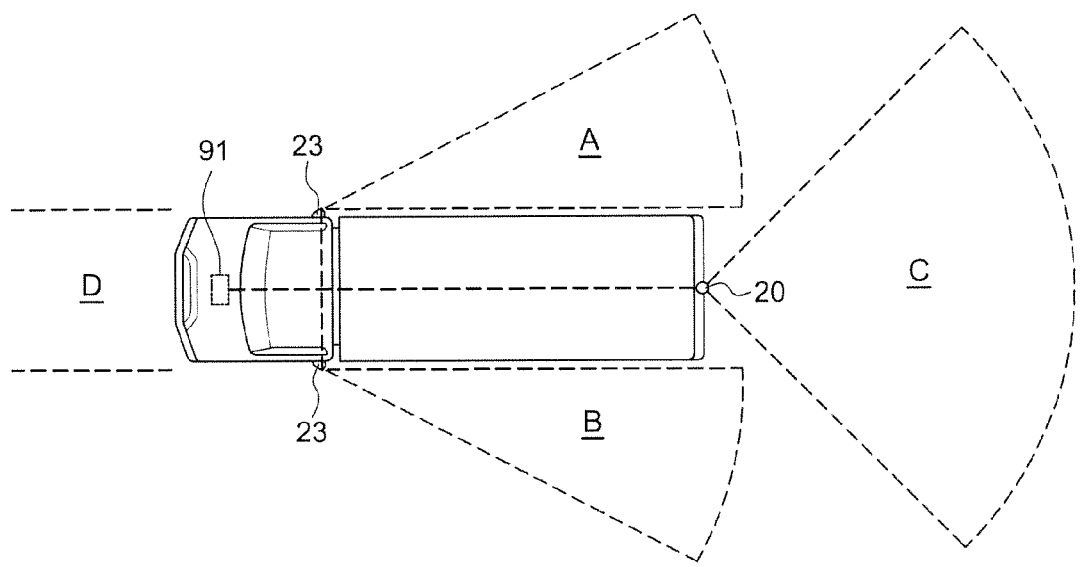
FIG. 9 is a schematic view of monitoring device of power line and camera in accordance with the present invention, the monitoring device detecting objects.

With the reference to FIGS. 8 and 9, the first camera 20, second camera 23, and third camera 92 is respectively arranged at the rear end of the vehicle 10, embedded in a rearview mirror 103 of the vehicle 10, and arranged at the front end of the vehicle 10 to form a monitoring region C right behind the vehicle 10, monitoring regions A and B rearward extending from the right and left perspective view, and monitoring region D right in front of the vehicle 10. The image signals 21, 24, 93 captured by the above cameras 20, 23, 92 can be recorded by the driving video recorder 91 for driver's accident record in order to clarify the attribution of liability.

Based on the features disclosed, the present invention integrates wireless signals, cable signals, and power to transmit image signals by power transmission. The present invention also provides single power line for each camera so that any of the cameras can be set at any position of the vehicle 10 to monitor the objects around the vehicle 10.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A monitoring device of power line and camera mounted on a vehicle, comprising:
    a cable line installed within the vehicle, and electrically connected to a power system of the vehicle to form a first power line;
    a first camera located at a periphery of the vehicle to capture a first image signal;
    a radio frequency transmitter having an input end electrically connected to the first camera and an output end electrically connected to the first power line, and the first image signal transmitted to the first power line by the radio frequency transmitter;

a screen host located in the vehicle to display the first image signal; and a radio frequency receiver having an input end electrically connected to the first power line and an output end electrically connected to the screen host, and the first power line as a medium receiving the first image signal from the radio frequency transmitter and transmitting the signal to the screen host;

whereby the first power line generates carrier wave for the first image signal as a radio frequency signal being transmitted to the wired cable line and then to the screen host; and wherein the radio frequency transmitter has a first circuit module; and the first circuit module has a modulator, a first oscillator, a first operational amplifier, and a first capacitor;

the first image signal or a second image signal is modulated into a high frequency signal by the modulator, transmitted to the first oscillator to produce a periodic sinusoidal wave signal, and then amplified by the first operational amplifier to be transmitted to the first capacitor for signal coupling, and finally the signal is transmitted to the first power line.

2. The monitoring device of power line and camera as claimed in claim 1, wherein the first camera is arranged at a rear end of the vehicle.

3. The monitoring device of power line and camera as claimed in claim 1, wherein the radio frequency transmitter is electrically connected to a second camera to capture a second image signal, and the second camera is embedded in a rearview mirror of the vehicle.

4. The monitoring device of power line and camera as claimed in claim 1, wherein the power line is electrically connected to a second power line, and the second power line is electrically connected to a driving video recorder.

5. The monitoring device of power line and camera as claimed in claim 4, wherein the driving video recorder is electrically connected to a third camera which captures a third image signal, and the third camera is arranged in a front end of the vehicle.

6. The monitoring device of power line and camera as claimed in claim 1, wherein the first power line in parallel is electrically connected to a first pulse-width modulation and a second pulse-width modulation to control voltage and supply power for the first camera or a second camera, and the first circuit module.

7. The monitoring device of power line and camera as claimed in claim 6, wherein the radio frequency receiver has a second circuit module, and the second circuit module has a demodulator, a frequency mixer, a second oscillator, a surface filter, a second operational amplifier, a third operational amplifier, a forth operational amplifier, and a second capacitor; the high frequency signal is transmitted to the first power line and the second capacitor for signal coupling, amplified by the second operational amplifier, and then transmitted to the second oscillator to produce periodic sinusoidal wave signal; at the same time, the amplified signal and sinusoidal wave signal are mixed by the frequency mixer to form intermediate frequency signal; the signal is amplified by the third operational amplifier, transmitted to the surface filter for noise filtering, and then amplified by the forth operational amplifier to be transmitted to the demodulator for the intermediate frequency signal being demodulated into the first image signal or second image signal, and finally the signal is transmitted to the screen host.

8. The monitoring device of power line and camera as claimed in claim 7, wherein the first power line in parallel is electrically connected to a third pulse-width modulation and forth pulse-width modulation to control voltage and supply power for the screen host, and the second circuit module.

9. The monitoring device of power line and camera as claimed in claim 8, wherein the first power line further has a first cable connector and second cable connector.

\* \* \* \* \*